B. KLEIN.
SLEIGH.
APPLICATION FILED JAN. 4, 1909.
950,292.
Patented Feb. 22, 1910.
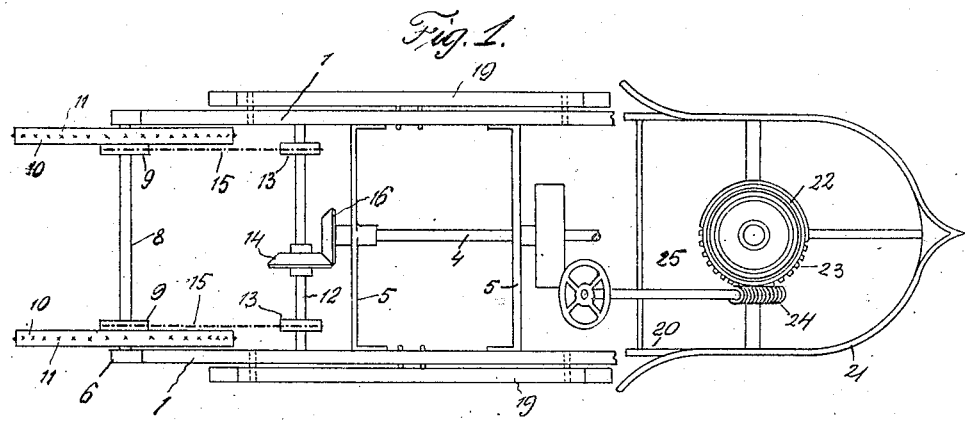
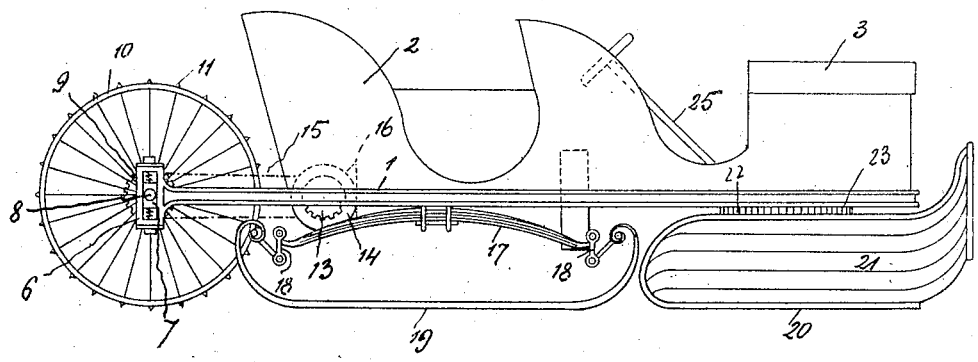
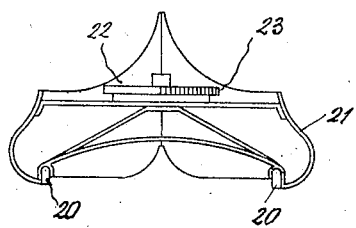
Witnesses
A. H. Rabsag,
K. H. Butler
Inventor
B. Klein,
By H. C. Evert & Co.
Attorneys

UNITED STATES PATENT OFFICE.

BERTALAN KLEIN, OF RALPHTON, PENNSYLVANIA.

SLEIGH.

950,292.  Specification of Letters Patent.  Patented Feb. 22, 1910.

Application filed January 4, 1909. Serial No. 470,585.

*To all whom it may concern:*

Be it known that I, BERTALAN KLEIN, a subject of the King of Hungary, residing at Ralphton, in the county of Somerset and State of Pennsylvania, have invented certain new and useful Improvements in Sleighs, of which the following is a specification, reference being had therein to the accompanying drawing.
This invention relates to sleighs, and the object of my invention is to provide a motor driven sleigh that can be easily propelled over snow covered ground, frozen rivers, and such surfaces where it is more economical and advantageous to use a sleigh than a wheeled vehicle. To this end, I provide an automobile body, with runners and with pronged or roughened wheels for engaging the frozen surface and propelling the sleigh over the ground.

The sleigh is constructed on the principle of an automobile, with seats, engines and steering gear similarly arranged.

The detail construction entering into my invention will be hereinafter described and then specifically pointed out in the appended claim.

In the drawings:—Figure 1 is a diagrammatic plan of my sleigh, Fig. 2 is a side elevation, and Fig. 3 is a rear elevation of the steering runner.

In the accompanying drawings, 1 designates the longitudinal frames of a body 2, this body having seats similar to an automobile, and a hood 3 for housing an engine (not shown) employed for driving a shaft 4 journaled longitudinally in braces 5 connecting the frames 1. The rear ends of the frames are provided with boxings 6 for bearings 7 in which is journaled a transverse axle 8. Upon this axle are mounted sprocket wheels 9 and large propeller wheels 10, said propeller wheels having prongs or teeth 11 adapted to engage in a frozen surface.
Journaled in the frames 1 is a transverse shaft 12 provided with sprocket wheels 13 and a beveled gear wheel 14. Passing over the sprocket wheels 13 and 9 are sprocket chains 15. The beveled gear wheel 14 meshes with a similar wheel 16 mounted upon the rear end of the driven shaft 4.

The frames 1 intermediate the ends thereof are provided with leaf springs 17 and the ends of these springs are connected by links 18 to the ends of runners 19.

The forward end of the sleigh body is supported upon runners 20, said runners supporting a plow frame 21 and a fifth wheel 22. The periphery of the fifth wheel 22 is provided with teeth 23 adapted to mesh with a worm 24 mounted upon the steering shaft 25 of the sleigh body, said shaft extending upwardly at an angle and in proximity to the operator's seat, similar to an automobile.

In operation, the plow frame 21 is adapted to shield the forward end of the sleigh and serve functionally as a fender for preventing persons from being run down by the sleigh. The plow frame also serves to deflect snow from the path of the sleigh.

Since the sleigh is steered and driven similar to an automobile, it is thought that the manner of operating the sleigh will be fully understood without further description.

Having now described my invention what I claim as new, is:—

In an automobile sleigh, a sleigh body, side rails supporting said body and provided with boxings at their rear ends, bearings mounted in said boxings, and an axle journaled in said bearings, toothed drive wheels carried by said axle to engage the surface traversed, means for driving said axle, leafsprings carried by said side rails intermediate the ends thereof, runners having their ends connected by links to the ends of said leaf-springs, runners at the forward ends of said rails, a fifth wheel and means engaging the same for guiding said forward runners, and a fender carried by said forward runners.

In testimony whereof I affix my signature in the presence of two witnesses.

BERTALAN KLEIN.

Witnesses:
AUREL H. RABSAG,
MAX H. SROLOVITZ.